United States Patent [19]

Aoyama et al.

[11] Patent Number: 4,689,195
[45] Date of Patent: Aug. 25, 1987

[54] FUEL ASSEMBLY

[75] Inventors: Motoo Aoyama, Hitachi; Kunitoshi Kurihara, Katsuta, both of Japan

[73] Assignee: Hitachi, Ltd., Tokyo, Japan

[21] Appl. No.: 635,927

[22] Filed: Jul. 30, 1984

Related U.S. Application Data

[63] Continuation of Ser. No. 375,588, May 6, 1982.

[30] Foreign Application Priority Data

May 15, 1981 [JP] Japan .................................. 56-72351
Jul. 20, 1981 [JP] Japan .................................. 56-112179

[51] Int. Cl.⁴ .......................... G21C 3/32; G21C 7/00
[52] U.S. Cl. ..................................... 376/435; 376/349
[58] Field of Search ................. 376/435, 428, 267, 349

[56] References Cited

U.S. PATENT DOCUMENTS

| | | | |
|---|---|---|---|
| 3,928,128 | 12/1975 | Kollmar et al. | 376/267 |
| 4,059,484 | 11/1977 | Bupp et al. | 376/435 |
| 4,229,258 | 10/1980 | Takeda et al. | 376/435 X |
| 4,324,615 | 4/1982 | Kobayashi et al. | 376/435 X |
| 4,483,818 | 11/1984 | Yamashita et al. | 376/435 |

FOREIGN PATENT DOCUMENTS

| | | | |
|---|---|---|---|
| 0051441 | 5/1982 | European Pat. Off. | 376/435 |
| 0065697 | 12/1982 | European Pat. Off. | 376/435 |
| 0009792 | 1/1977 | Japan | 376/435 |
| 0109089 | 9/1978 | Japan | 376/435 |
| 0013283 | 1/1985 | Japan | 376/267 |
| 0955485 | 4/1964 | United Kingdom | 376/435 |

OTHER PUBLICATIONS

"Fundamental Aspects of Nuclear Reactor Fuel Elements", 1976, p. 114, Olander.
"Mark's Standard Handbook for Mechanical Engineers", 1969, pp. 9-124, Baumeister et al.

Primary Examiner—Deborah L. Kyle
Assistant Examiner—Daniel Wasil
Attorney, Agent, or Firm—Antonelli, Terry & Wands

[57] ABSTRACT

In a nuclear reactor, gaps are defined between fuel assemblies so that moderators can be inserted. Hence, the nuclear characteristics vary between the central portion and periphery of the fuel assembly so that the local output peaking becomes greater on the periphery of the fuel assembly. The present invention flattens the local output peaking by providing that the quantity of a nuclear fuel material per fuel rod loaded in the fuel rods on the periphery of the fuel assembly is smaller than the quantity of the fuel material per fuel rod loaded in the fuel rods at the central portion of the fuel assembly. Any one of the following three constructions can be used:

(1) The theoretical density of the nuclear fuel material pellets to be inserted into the fuel rod is reduced.
(2) The nuclear fuel material pellets to be inserted into the fuel rod is made hollow.
(3) The diameter of the fuel rod is reduced.

6 Claims, 12 Drawing Figures

FIG. 10

| 16 | 15 | 15 | 14 | 14 | 14 | 15 | 16 |
|----|----|----|----|----|----|----|----|
| 15 | 17 | 13 | 13 | 13 | 17 | 14 | 15 |
| 15 | 13 | 13 | 13 | 13 | 13 | 17 | 14 |
| 14 | 13 | 13 | 13 | 18 | 13 | 13 | 14 |
| 14 | 13 | 13 | 18 | 13 | 13 | 13 | 14 |
| 14 | 17 | 13 | 13 | 13 | 13 | 13 | 15 |
| 15 | 14 | 17 | 13 | 13 | 13 | 17 | 15 |
| 16 | 15 | 14 | 14 | 14 | 15 | 15 | 16 |

FIG. 11

| 23 | 22 | 22 | 21 | 21 | 21 | 22 | 23 |
|----|----|----|----|----|----|----|----|
| 22 | 24 | 19 | 19 | 19 | 24 | 20 | 22 |
| 22 | 19 | 19 | 19 | 19 | 19 | 24 | 21 |
| 21 | 19 | 19 | 19 | 19 | 19 | 19 | 21 |
| 21 | 19 | 19 | 19 | 19 | 19 | 19 | 21 |
| 21 | 24 | 19 | 19 | 19 | 19 | 19 | 22 |
| 22 | 20 | 24 | 19 | 19 | 19 | 24 | 22 |
| 23 | 22 | 21 | 21 | 21 | 22 | 22 | 23 |

FIG. 12

| 29 | 28 | 28 | 27 | 27 | 27 | 28 | 29 |
|----|----|----|----|----|----|----|----|
| 28 | 30 | 25 | 25 | 25 | 30 | 26 | 28 |
| 28 | 25 | 25 | 25 | 25 | 25 | 30 | 27 |
| 27 | 25 | 25 | 25 | 31 | 25 | 25 | 27 |
| 27 | 25 | 25 | 31 | 25 | 25 | 25 | 27 |
| 27 | 30 | 25 | 25 | 25 | 25 | 25 | 28 |
| 28 | 26 | 30 | 25 | 25 | 25 | 30 | 28 |
| 29 | 28 | 27 | 27 | 27 | 28 | 28 | 29 |

FUEL ASSEMBLY

This is a continuation of application Ser. No. 375,588, filed May 6, 1982.

BACKGROUND OF THE INVENTION

This invention relates to a fuel assembly for a reactor. The fuel assembly consists of a predetermined number of fuel rods that are bundled by a support grating i.e., a channel box, in a group as a handling unit. A predetermined number of fuel assemblies are set up in moderators in the reactor and the gaps between the fuel assemblies are kept so that the fuel assemblies can be individually inserted or withdrawn or control rods can be easily inserted between the fuel assemblies. Accordingly, the fuel rods located on the periphery of the fuel assemblies are surrounded by a greater number of moderators than those located at the central portion. As a result, thermalization of neutrons proceeds effectively on the periphery of fuel assemblies to cause more vigorous nuclear fission, to raise the local output peaking coefficient on the periphery and to reduce thermal allowance. For these reasons, the enrichment gradation (lowering the fuel pellets enrichment on the periphery of the assembly than at the central portion) has been employed in the conventional boiling water reactors in order to equalize the local output peaking factors of the fuel assemblies. However, this method invites the following problems.

(1) The fissionable material is left unburnt at the central portion of the fuel assembly and hence, the fuel resources can not be utilized effectively.

(2) Since the fuel having higher enrichment must be disposed at the central portion of fuel assembly where having smaller importance while the fuel having lower enrichment must be disposed on the periphery of the fuel assembly where having greater importance, the infinite neutron multiplication factor of the fuel assemblies as a mean value drops.

(3) Fuel pellets having higher enrichment than the mean enrichment must be used in order to give the enrichment gradation. This reduces the maximal value of the atomic number of the fissionable material to be packed into the fuel assembly since there exists a limitation to the highest pellet enrichment at present, and reduces the derivable discharged burnup. This is not desirable for a high burnup core using high enrichment fuel pellets.

SUMMARY OF THE INVENTION

To solve these problems, the present invention is directed to provide fuel assemblies that can effectively burn the fissionable material while equalizing the local output peaking factors, can keep the overall output uniform and can effectively consume the fuel resources.

To accomplish this object, the fuel assembly of the present invention is characterized in that the mean value of the quantity of the fissionable material loaded or packed in the fuel rod, per unit fuel rod, of the fuel rods of the outermost or periperal layer is lowered than that of the other fuel rods of the other protions of the fuel assembly.

The following three methods can be used to reduce the quantity of the fissionable material load or packed per unit fuel rod, hereinafter called "loading quantity".

(1) The theoretical density of the fuel pellets material to be packed into the fuel rod is reduced.

(2) Hollow pellets are used.

(3) Thinner diameter fuel rods are used.

The methods (1) and (2), that is, the constructions in which the mean density of the pellets form densification upon burnup that would otherwise occur in carrying out a high level of burnup.

The constructions (2) and (3) make it easier to carry out the density control. Since the method (3) reduces the diameter of the cladding tube of the fuel rod, the quantity of the moderator increases as much. Accordingly, the ratio of number of atoms (M/F) between the moderator (M) and the fissionable material (F) can be increased by a slight change.

BRIEF DESCRIPTION OF THE DRAWINGS

FIG. 10 is a transverse sectional view of the conventional fuel assembly for the sake of comparison; and FIG. 11 is a transverse sectional view of the fuel assembly in accordance with another embodiment of the present invention.

FIG. 12 is a transverse sectional view of the fuel assembly in accordance with another embodiment of the present invention.

DESCRIPTION OF THE PREFERRED EMBODIMENTS

Hereinafter, the present invention will be described with reference to a boiling water reactor by way of example.

Figure 1:
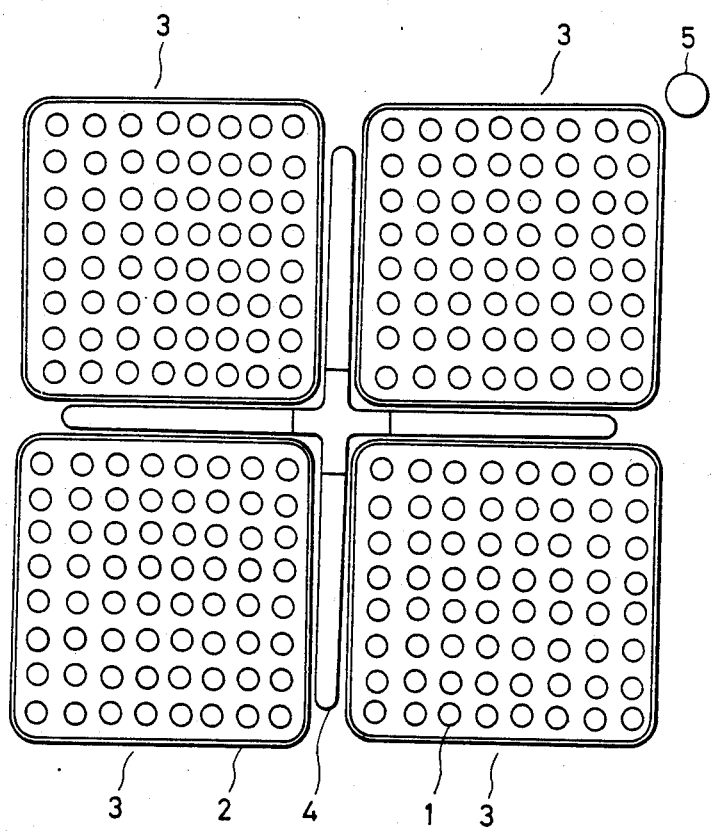
FIG. 1 is a transverse sectional view of the fuel assemblies.

As shown in FIG. 1, in the boiling water reactor, each fuel assembly consists of a group of fuel rods 1 arranged in a rectangular or square array within a channel box 2 through which coolant of the core flows. A control rod 4 or a neutron detector fitting pipe 5 is disposed outside the channel box 2. The gap between the fuel assemblies 3 is kept so that the device such as the control rod 4 can be inserted. The periphery of the fuel assembly is filled with the cooling water. In this case, the fuel rods 1 positioned on the periphery of the fuel assembly 3 are surrounded with a greater quantity of water than those positioned at the central position of the fuel assembly 3. As a result, the following nuclear heterogeneous effects (i) and (ii) occur between the periphery portion and the central portion of the fuel assembly 3.

(i) Thermalization of neutron proceeds effectively around the fuel assembly where a greater amount of water as the moderator of the neutron exists. Hence, the number of thermal neutrons becomes greater at these portions than at the central portion.

Figure 2:
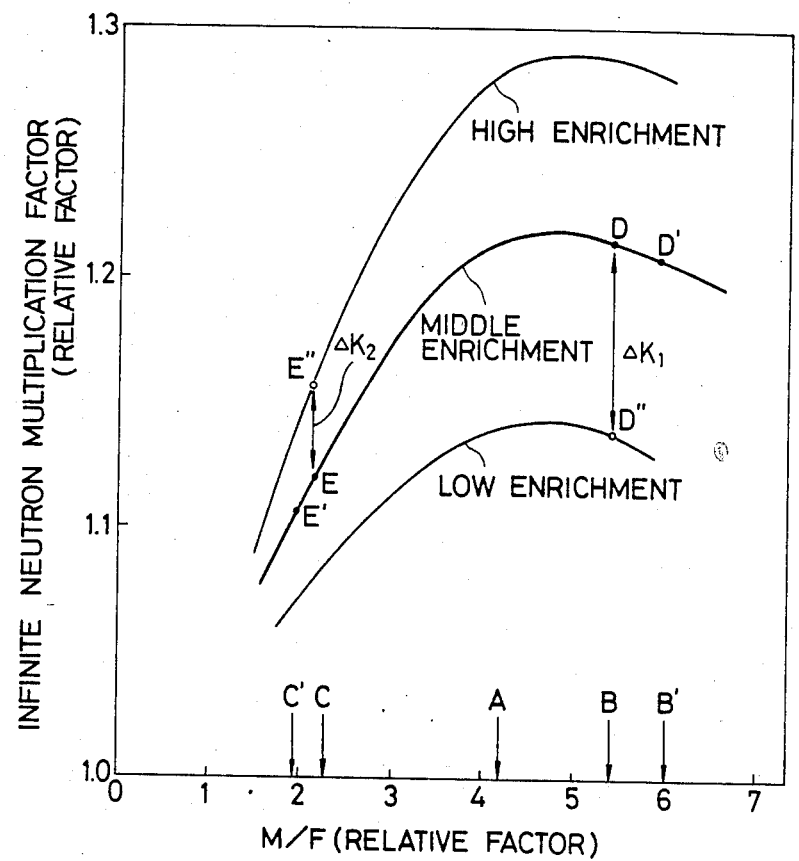
FIG. 2 is a diagram showing the relation between the infinite neutron multiplication factor and the ratio M/F.

(ii) In consequence, differences occur in the mean neutron energy and in the infinite neutron multiplication factor between the periphery portions and central portion of the fuel assembly. As shown in FIG. 2, as the position approaches closer to the periphery portions of the fuel assembly, that is, as the ratio of atomic numbers (M/F) of the moderator (M) to the fissionable material (F) increases, the infinite neutron multiplication factor increases gradually and after passing a predetermined peak, it decreases gradually. This is because the water provides the advantage that it promotes deceleration of neutrons to improve the infinite multiplication factor as well as the disadvantage of absorption. The practical fuel asembly is designed so that the void coefficient is always negative. Hence, the point A of FIG. 2 is used as the mean M/F of the fuel assemblies. However, the operation is effected at the point B, which is an over-deceleration range, on the periphery of the fuel assembly whereas the operation is effected at the point C, which is an insufficient deceleration range, at the central portion of the fuel assembly. Accordingly, the infinite neutron multiplication factor is greater at the central area of the fuel assembly.

Accordingly, if the enrichment of the fuel rods inside a given fuel assembly is made uniform, the nuclear fission reaction occurs more vigorously on the periphery of the fuel assembly, thus elevating the local output peaking coefficient on the periphery and reducing the thermal allowance.

In accordance with the present invention, the mean value of the loading quantity of the fissionable material, per fuel rod, of the fuel rods on the periphery of the fuel assembly is made smaller than that at the central portion of the fuel assembly.

Figure 3:
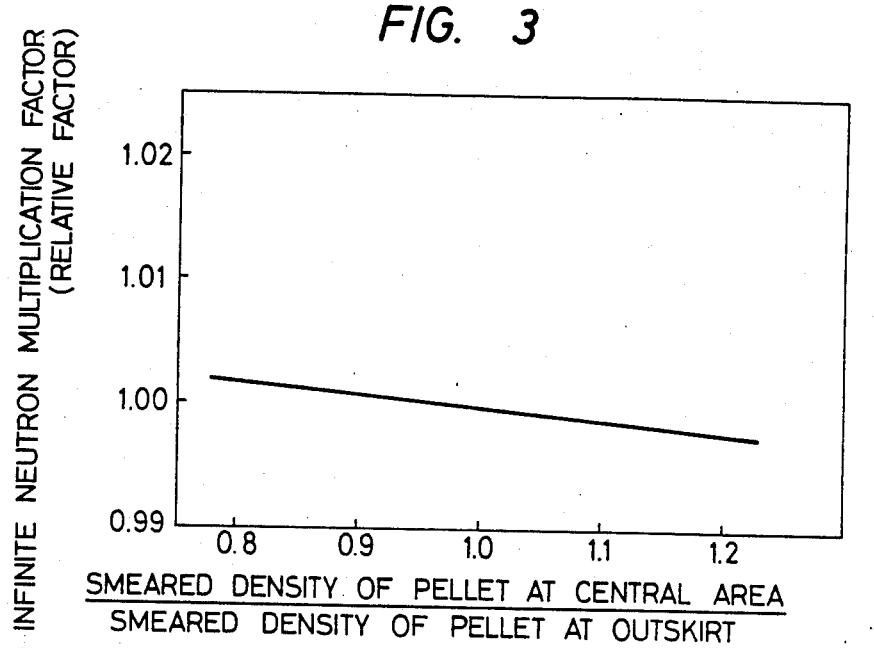
FIG. 3 is a diagram showing the relation between the infinite neutron multiplication factor and the ratio of the smeared density of the pellets at the central portion to the smeared density of the pellets on the periphery.
Figure 4:
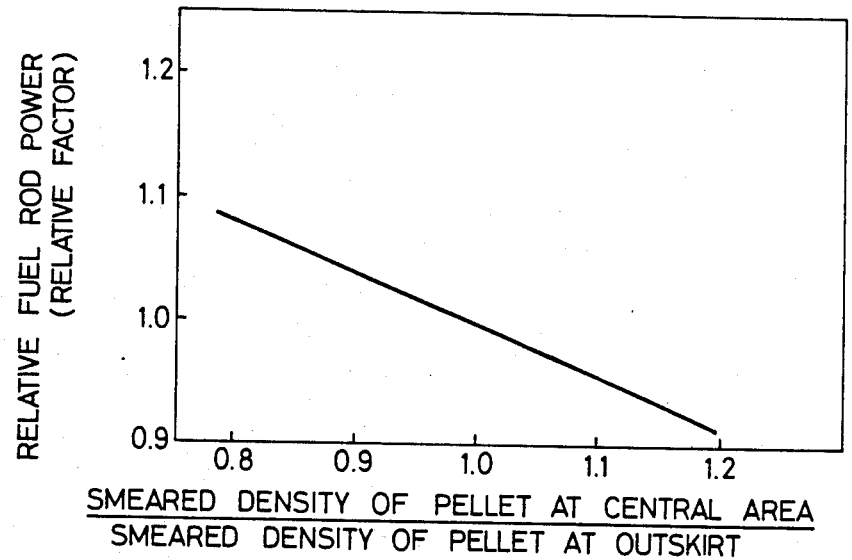
FIG. 4 is a diagram showing the relation between the relative fuel rod output and the above-mentioned ratio of the smeared density.

FIG. 3 shows the relation between the infinite neutron multiplication factor and the ratio of the smeared density of pellets at the central portion to the smeared density of pellets at the periphery when both loading quantity and mean enrichment of the fuel material are kept constant and FIG. 4 shows the relation between the relative fuel rod power and the same ratio under the same condition as above.

Figure 5:
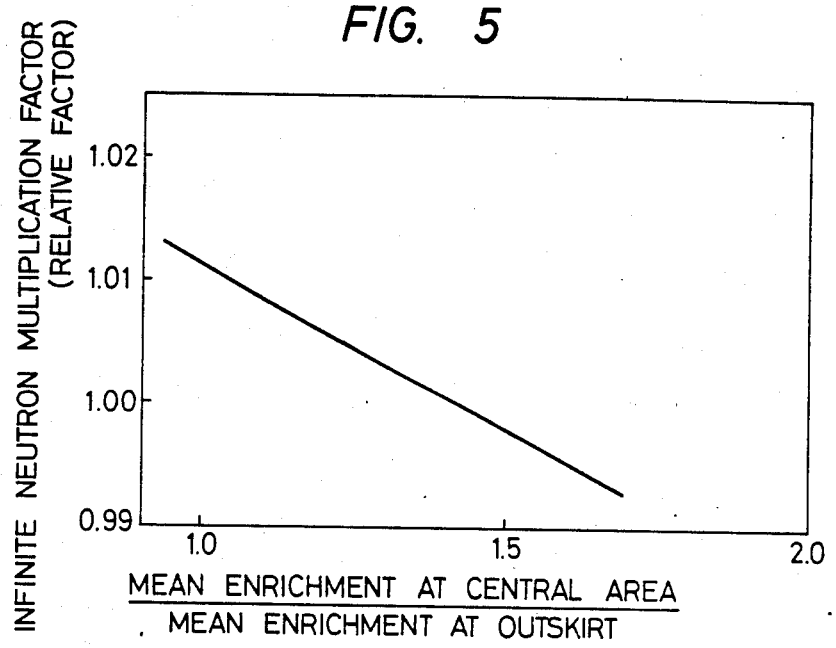
FIG. 5 is a diagram showing the relation between the infinite neutron multiplication factor and the ratio of the mean enrichment at the central portion to the mean enrichment on the periphery.
Figure 6:
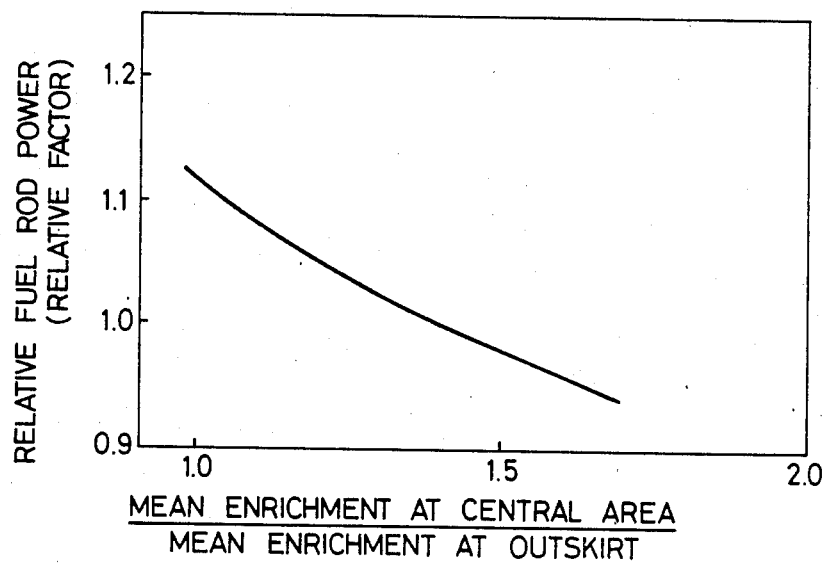
FIG. 6 is a diagram showing the relation between the relative fuel rod output and the above-mentioned ratio of the mean enrichment.

For the sake of comparison, FIG. 5 shows the relation between the infinite neutron multiplication factor and the ratio of the mean enrichment at the central portion to the mean enrichment at the periphery and FIG. 6 shows the relation between the relative fuel rod output and the abovementioned ratio, using the ratio of the mean enrichment at the central portion to that on the periphery as a parameter, respectively.

The infinite neutron multiplication factor of the fuel assembly, in which the mean pellet density is lower on the periphery and higher at the central portion, will be compared with the infinite neutron multiplication factor of the fuel assembly which has the enrichment distribution, with reference to FIG. 2. The ratio M/F on the periphery can be increased from B to B' by reducing the pellet mean density on the periphery of the fuel assembly as compared with the conventional fuel assembly. As is obvious from this diagram, the neutron absorption effect of the water becomes greater on the periphery of the fuel assembly when the ratio M/F increases, whereas the thermal neutrol utilization factor drops. As a result, the infinite neutron multiplication factor slighly drops from D to D'. On the other hand, the ratio M/F drops from C to C' at the central portion, on the contrary, when the pellet mean density is increased. As a result, the infinite neutron multiplication factor drops from E to E' in FIG. 2 but since the mean neutron energy drops due to inflow of the neutrons thermalized on the periphery of the fuel assembly, the inifinite neutron multiplication factor slightly rises, on the contrary. As a result, the drop of the infinite neutron multiplication factor of the fuel assemblies as a whole is limited in comparison with the fuel assembly having uniform enrichment distribution. Since the quantity of the fissionable material is reduced by reducing the pellet mean density on the periphery of the fuel assembly and since the above-mentioned effect of the infinite neutron multiplication factor is obtained, the relative fuel rod power can be remarkably reduced.

On the other hand, the infinite neutron multiplication factor of the fuel assembly having the enrichment distribution changes from D to D'' in FIG. 2 on the periphery 2 because the enrichment becomes lower at the central area, on the contrary and rises from E to E'' at the central area because the enrichment becomes higher. When the enrichment becomes higher, the deceleration ratio ($yZ_s/Z_a$, where y is a mean value of decrement of the energy logarithm per collision and $Z_{s(a)}$ is the sectional area of macroscopic scattering (absorption)) becomes smaller. The change quantity $\Delta k_1$ of the infinite neutron multiplication factor with the change of enrichment at the point, where M/F is large, becomes greater than the change quantity $\Delta k_2$ at the point where M/F is small. As a result, the infinite neutron multiplication factor of the fuel assemblies as a whole can be increased more greatly by changing the pellet mean density than by changing the enrichment distribution.

Figure 7:
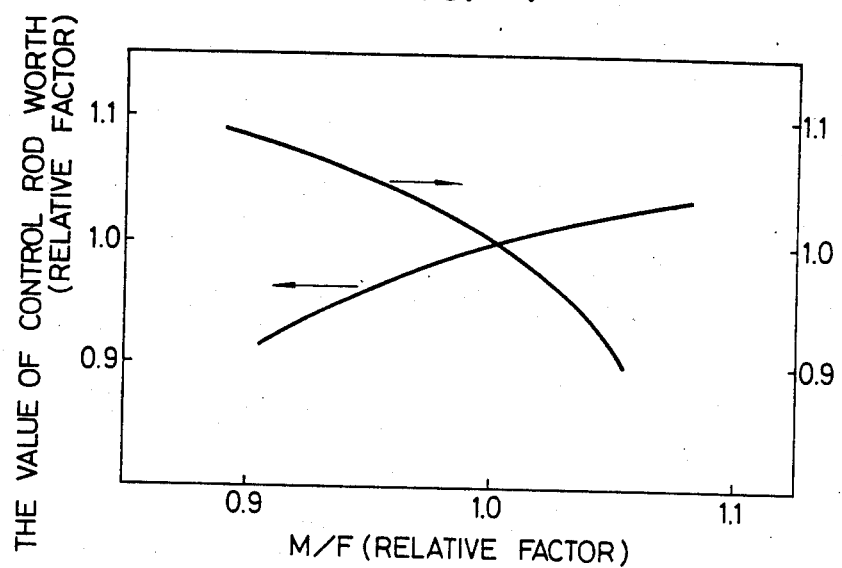
FIG. 7 is a diagram showing the relation of the control rod worth and the void coefficient versus the ratio M/F.
Figure 8:
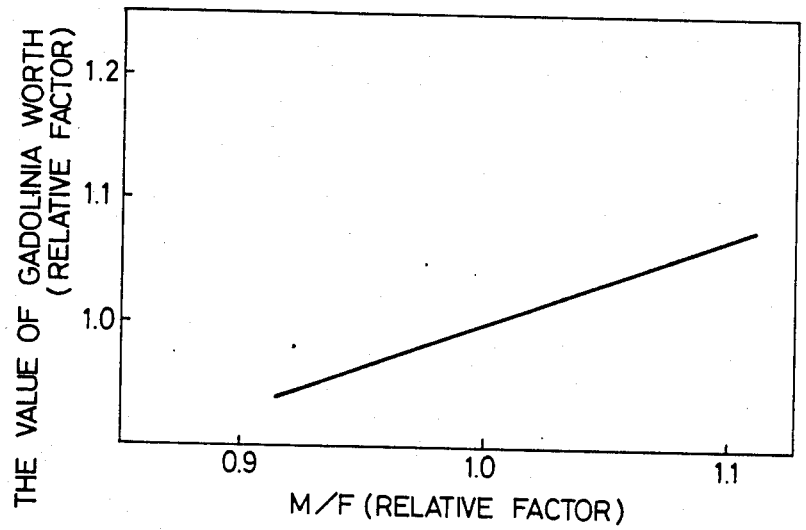
FIG. 8 is a diagram showing the relation between the value of Gadolinia worth and the ratio M/F.

Since the mean M/F of the fuel assemblies as a whole can be increased by reducing the pellet mean density on the peripheral portions, the neutron mean energy drops so that both values of control rod worth and Gadolinia worth can be increased while the output coefficient can be reduced. This is effective for a high burnup core using a high enrichment fuel and also makes it possible to realize a stable core in the conventional cores. FIGS. 7 and 8 show the relation between the ratio M/F and the value of control rod worth and between the ratio M/F and the value of Gadolinia worth, respectively.

The fuel assembly obtained in the abovementioned manner can reduce the quantity of fuel to be loaded on the fuel rods of the core without raising the mean enrichment of the fuel assemblies as a whole and without deteriorating the local output peaking coefficient. It is thus possible to reduce the quantity of natural uranium, the separation work unit (hereinafter abbreviated as "SWU") and the quantity to be reprocessed.

The present invention does not exclude the method of generating the mean enrichment distribution and can use conjointly such a method. The method can be used especially effectively for the fuel rods at the corners of the rectangular array of the fuel rods of the fuel assembly.

Hereinafter, embodiments of the present invention will be described definitely.

[EXAMPLE 1]

Figure 9:
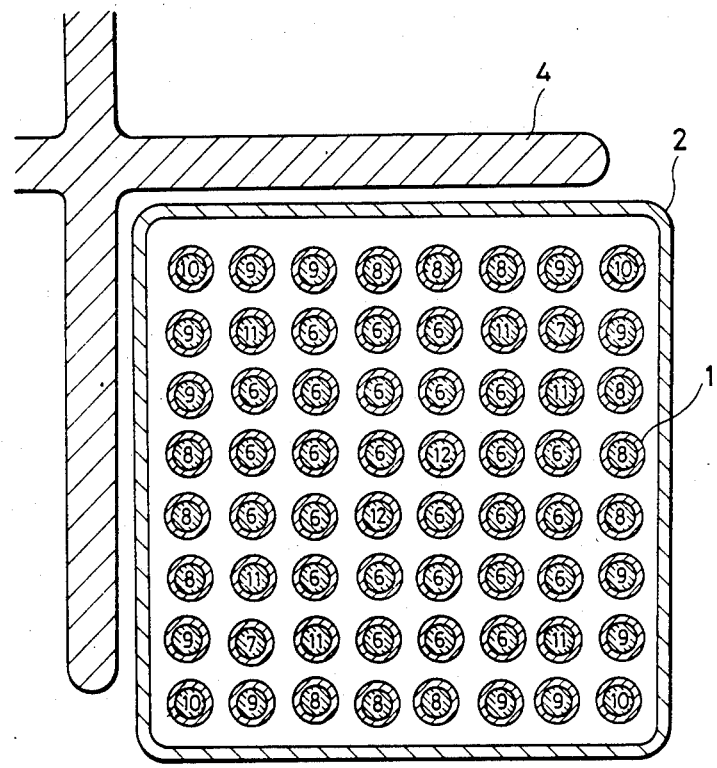
FIG. 9 is a transverse sectional view of the fuel assembly in accordance with an embodiment of the present invention.

In this example, the present invention is shown applied to an ordinary 8×8 fuel assembly. FIG. 9 shows the transverse section of this example. As the fuel rods 1, those represented by reference numerals 6 through 11 are employed. Table 1 shows the enrichment and pellet mean density of each fuel rod. Reference numeral 12 represents a water rod.

TABLE 1

| Fuel rod No. | 6 | 7 | 8 | 9 | 10 | 11 |
|---|---|---|---|---|---|---|
| enrichment (w/o) | 3.1 | 2.3 | 2.9 | 2.6 | 2.0 | 2.3 + 3 wt. % $G^d_2O_3$ |
| number of fuel rods per fuel assembly | 26 | 2 | 12 | 12 | 4 | 6 |
| pellet mean density (%) | 95 | 95 | 85 | 85 | 85 | 95 |

[COMPARATIVE EXAMPLE]

FIG. 10 shows the transverse section of the conventional fuel assembly. In this case, fuel rods 13 through 17 shown in Table 2 are employed. Reference numeral 18 represents a water rod. In this example, the pellet mean density is 95% for all the rods.

The mean enrichment is uniform in the fuel assemblies of both Example 1 and Comparative Example 1 and the enrichment at the central area in Example 1 is 0.9 times that in Comparative Example 1. Table 3 shows the enrichment and pellet mean density at the central portion and on the periphery for each of Example 1 and Comparative Example 1.

TABLE 2

| Fuel rod No. | 13 | 14 | 15 | 16 | 17 |
|---|---|---|---|---|---|
| enrichment (w/o) | 3.4 | 2.5 | 2.2 | 1.7 | + 3 wt % $G^d_2O_3$ |
| number of fuel rod per fuel assembly | 26 | 14 | 12 | 4 | 6 |

TABLE 3

| | periphery of fuel assembly | central area of fuel assembly |
|---|---|---|
| enrichment | | |
| conventional example (w/o) | 2.26 | 3.19 |
| example of this invention (w/o) | 2.65 | 2.87 |
| mean density | | |
| conventional example (%) | 95 | 95 |
| example of this invention (%) | 85 | 95 |

The infinite neutron multiplication factor at the initial stage of burnup can be increased by about 0.8% by changing the enrichment ratio between the central area and on the periphery of the fuel assembly from the conventional value 1.4 to 11. As a result, the derivable or discharged burnup can be extended and the assembly output or power reaches the same value as the conventional value even when the loading uranium quantity is smaller. On the other hand, the local output peaking coefficient can be equalized substantially to the conventional value by changing the pellet mean density by 10% between the periphery and the central portion of the fuel assembly. FIG. 4 shows the loading uranium quantity per unit output, the necessary natural uranium quantity, the SWU, the control rod worth and the void coefficient with those of the conventional values being 1, respectively.

TABLE 4

| | loading uranium quantity | necessary uranium quantity | SWU | control rod worth | void coefficient |
|---|---|---|---|---|---|
| Example 1 | 0.95 | 0.95 | 0.95 | 1.03 | 0.93 |

[EXAMPLE 2]

This example also shows the application of the present invention to an ordinary fuel assembly. FIG. 11 shows the transverse section of the fuel assembly of the present invention. As the fuel rods, those represented by reference numerals 19 through 24 are employed. The enrichment and pellet mean density of each fuel rod are shown in Table 5. No water is used.

TABLE 5

| Fuel rod No. | 19 | 20 | 21 | 22 | 23 | 24 |
|---|---|---|---|---|---|---|
| enrichment (w/o) | 3.60 | 2.25 | 2.93 | 2.58 | 2.0 | 2.25 + 3 wt % $G^d_2O_3$ |
| number of fuel rods per fuel assembly | 28 | 2 | 12 | 12 | 4 | 6 |
| pellet mean density (%) | 95 | 95 | 85 | 85 | 85 | 85 |

In this example, the decrease of the void coefficient and flattening of the local output peaking coefficient are accomplished by reducing the pellet mean density on the periphery of the fuel assembly by 10% as compared with that at the central portion. This arrangement makes it possible to replace the water rod, that has conventionally served for this purpose, by the fuel rod. As a result, the number of fuel assemblies can be reduced by about 4% as compared with Example 1. Table 6 shows the loading uranium quantity per unit output or powder, the necessary uranium quantity, the SWU, the control rod worth and the void coefficient in this example with the conventional values being 1.

TABLE 6

| | loading uranium quantity | necessary natural uranium quantity | SWU | control rod worth | void coefficient |
|---|---|---|---|---|---|
| Example 2 | 0.93 | 0.93 | 0.93 | 1.01 | 0.99 |

[EXAMPLE 3]

This example shows the application of the present invention to a fuel assembly for a high burnup core using a fuel assembly of about 5 wt% enrichment. In the case of the fuel assembly in which the maximum enrichment of the pellet used is limited to 5.5 wt%, the mean enrichment of the fuel assemblies becomes 5.1 w/o from the enrichment distribution shown in Table 7.

TABLE 7

| | periphery of fuel assembly | central area of fuel assembly |
|---|---|---|
| enrichment | 4.6 | 5.5 |

On the other hand, the enrichment of all the fuel rods is set to 5.1 wt% and the pellet mean density is such that the mean value on the periphery is lower by 15% than that at the central area. As a result, the assembly output can be made the same as that in the case having the enrichment distribution shown in Table 7 without deteriorating the local output peaking factor of the fuel assembly, and the necessary natural uranium quantity per unit output, the uranium quantity and the SWU can be reduced by about 2% (in comparison with the case in which the enrichment distribution exists as shown in Table 7.

It can be understood from the foregoing examples that even when the pellet enrichment is only one kind, the local output peaking factor can be made the same as the conventional value. If there is a limit to the maximum enrichment of the pellet used, therefore, the present invention makes it possible to make the mean enrichment of the fuel assembly maximum. If the enrichment of all the fuel rods is set to the limit value of 5.5 wt%, the derivable burnup can be extended by about 3 GWd/st. This represents the cycle period by about 2 months. Table 8 shows the loading uranium quantity per unit output or powder, the necessary natural uranium quantity and the SWU with those of the fuel assembly having the enrichment distribution of Table 7 being 1, respectively.

TABLE 8

|  | loading uranium quantity | necessary natural uranium quantity | SWU |
| --- | --- | --- | --- |
| Example 3 | 0.91 | 0.98 | 1.0 |

As described in the foregoing, by the simple method of reducing the mean value of the pellet mean density on the periphery of the fuel assembly to the value lower than that at the central portion of the fuel assembly, a output can be rendered flat by effectively utilizing the nuclear heterogeneity of the fuel assembly so that the uranium resources can be saved while keeping the mean enrichment of the fuel assembly and the local output peaking factor substantially equal to the conventional values. Since the loading uranium quantity can be reduced, the quantity to be reprocessed can be reduced and a core having higher safety can be realized.

Next, the fuel assemblies having the aforementioned constructions (2) and (3), in which the ratio of the cross-sectional area of the fuel pellet to the cross-sectional area of the coolant or moderator passage in any unit square of the fuel assembly is smaller on the periphery than at the central portion, will be described.

[EXAMPLE 4]

FIG. 12 shows the transverse section of the fuel assembly. Fuel rods represented by reference numerals 25 through 30 are used as the fuel rods. Table 9 shows the enrichment and pellet diameter of each fuel rod. The enrichment of this fuel assembly is determined to be 0.9 times the enrichment at the central portion of the conventional fuel assembly with the mean enrichment being equal to the conventional value. The diameter of the fuel rods 27, 28, 29 on the periphery is reduced by 5% as compared with the diameter of the fuel rods 25, 26, 30 at the central portion (the pellet diameter is also reduced by 5%) so that the ratio of the cross-sectional area of the water or coolant passage to the cross-sectional area of the fuel pellet in any unit square on the periphery of the fuel assembly is made greater by 21% than that at the central area. Table 10 shows the ratio of the mean enrichment on the periphery to the central portion and the ratio of the cross-sectional area of the coolant or water passage to the cross-sectional area of the fuel pellet in any unit square of the fuel assembly in comparison with the conventional values, respectively.

TABLE 9

| Fuel rod No. | 25 | 26 | 27 | 28 | 29 | 30 |
| --- | --- | --- | --- | --- | --- | --- |
| enrichment (w/o) | 3.1 | 2.3 | 2.9 | 2.6 | 2.0 | 2.3 + 3 wt % $G^d_2O_3$ |
| number of fuel rods per fuel assembly | 26 | 2 | 12 | 12 | 4 | 6 |
| pellet diameter (mm) | 10.31 | 10.31 | 9.75 | 9.75 | 9.75 | 10.31 |

TABLE 10

|  | periphery of fuel assembly | Central area of fuel assembly |
| --- | --- | --- |
| enrichment |  |  |
| conventional value (w/o) | 2.29 | 3.19 |
| this example (w/o) | 2.65 | 2.87 |
| ratio of water to sectional area |  |  |
| conventional value | 1.71 | 1.71 |
| this example | 2.07 | 1.71 |

As a result, the local output peaking can be made equal to the conventional value but the derivable burnup can be enhanced by about 5%. Table 11 shows the loading uranium quantity per unit output, the necessary natural uranium quantity, the SWU, the control rod worth and the void coefficient in this example in comparison with the conventional values that are 1, respectively.

TABLE 11

|  | loading uranium quantity | necessary natural uranium quantity | SWU | control rod worth | void coefficient |
| --- | --- | --- | --- | --- | --- |
| Example 1 | 0.95 | 0.95 | 0.95 | 1.04 | 0.90 |

What is claimed is:

1. An unirradiated fuel assembly for a nuclear reactor core comprising a plurality of fuel rods containing nuclear fuel material in the form of solid fuel pellets, the fuel rods being disposed in a rectangular array within a coolant passage, all of the fuel rods disposed at a periphery of the array having a mean value of density of nuclear fuel material of the fuel pellets of the fuel rod which is lower than a mean value of density of nuclear fuel material of the fuel pellets of the fuel rods arranged at other portions of the array, the nuclear fuel material contained in the fuel rods of the array being the same material, and wherein among the fuel rods at the periphery of the array, the fuel rods at peripheral corners of the periphery of the array have an enrichment which is lower than the enrichment of the other fuel rods at the periphery of the array, the fuel rods at the periphery of the array having a mean enrichment which is lower than the mean enrichment of the fuel rods at the other portions, the fuel rods at the periphery of the array and the fuel rods at the other portions of the array having the same diameter.

2. A fuel assembly according to claim 1, wherein the difference in mean value of density of nuclear fuel material of the fuel pellets is 10%.

3. An unirradiated fuel assembly for a nuclear reactor core comprising a plurality of fuel rods containing nuclear fuel material in the form of solid fuel pellets, the fuel rods being disposed in a rectangular array within a coolant passage, all of the fuel rods being disposed at a periphery of the array having a mean value of density of nuclear fuel material of the fuel pellets of the fuel rod which is lower than a mean value of density of nuclear fuel material of the fuel pellets of the fuel rods arranged at other portions of the array, the nuclear fuel material contained in the fuel rods of the array being the same material and having at least one predetermined enrichment, the fuel rods at the periphery of the array and the fuel rods at the other portions of the array having the same diameter.

4. A fuel assembly according to claim 3, wherein among the fuel rods at the periphery of the array, the fuel rods at peripheral corners of the array have an enrichment which is lower than the enrichment of the other fuel rods at the periphery of the array.

5. A fuel assembly according to claim 3, wherein the fuel rods at the periphery of the array have a mean enrichment which is lower than the mean enrichment of the fuel rods at the other portions of the array.

6. A fuel assembly according to claim 3, wherein the difference in mean value of density of nuclear fuel material of the fuel pellets is 10%.

* * * * *